United States Patent
Ramoutar et al.

(10) Patent No.: US 12,497,805 B2
(45) Date of Patent: Dec. 16, 2025

(54) VEHICLE DOOR ASSEMBLY INCLUDING A DOOR LATCH STOPPER BRACKET

(71) Applicant: Toyota Motor Engineering & Manufacturing North America, Inc., Plano, TX (US)

(72) Inventors: Naipaul D. Ramoutar, Ann Arbor, MI (US); Willliam F. Graves, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/669,950

(22) Filed: May 21, 2024

(65) Prior Publication Data
US 2025/0361750 A1    Nov. 27, 2025

(51) Int. Cl.
E05B 77/04    (2014.01)

(52) U.S. Cl.
CPC .................................. E05B 77/04 (2013.01)

(58) Field of Classification Search
CPC ........... E05B 77/04; E05B 77/02; E05B 77/06
See application file for complete search history.

(56) References Cited

U.S. PATENT DOCUMENTS

| | | | |
|---|---|---|---|
| 4,382,622 A * | 5/1983 | Ishikawa | E05B 77/12 292/216 |
| 5,069,493 A | 12/1991 | Haruo et al. | |
| 5,813,709 A | 9/1998 | Masaaki | |
| 12,172,501 B2 * | 12/2024 | Snyder | E05B 79/20 |
| 2011/0062747 A1 * | 3/2011 | Teramoto | E05B 77/04 296/146.1 |
| 2011/0115251 A1 * | 5/2011 | Jordan | E05B 77/04 292/336.3 |
| 2011/0115252 A1 * | 5/2011 | Higgins | E05B 77/04 292/336.3 |
| 2011/0271721 A1 * | 11/2011 | Muramatsu | E05B 77/12 70/101 |

(Continued)

FOREIGN PATENT DOCUMENTS

| | | |
|---|---|---|
| CN | 217353940 U | 9/2022 |
| FR | 3117143 * | 6/2022 |
| KR | 1020000041765 A | 7/2000 |

Primary Examiner — Gregory J Strimbu
(74) Attorney, Agent, or Firm — Dinsmore & Shohl LLP

(57) ABSTRACT

A vehicle includes a vehicle door assembly including a door handle assembly and a door latch assembly that includes a door latch device operatively connected to the door handle assembly using a latch release lever that moves along a travel path to place the door latch assembly in an unlatched configuration. The door latch assembly includes the latch release lever that is configured to move between a latched configuration and the unlatched configuration. A glass guide assembly is mounted in the vehicle door assembly including a guide body and a door latch stopper bracket mounted to the guide body arranged and configured such that movement of an outer door panel toward an inner door panel during a side impact event moves the guide body toward the door latch assembly and causes the door latch stopper bracket to engage the latch release lever and inhibit movement of the latch release lever.

9 Claims, 6 Drawing Sheets

(56) References Cited

U.S. PATENT DOCUMENTS

| | | | |
|---|---|---|---|
| 2013/0074413 A1* | 3/2013 | Moriya | E05B 79/20 |
| | | | 49/394 |
| 2014/0312632 A1* | 10/2014 | Nagaoka | E05B 77/04 |
| | | | 292/200 |
| 2016/0168882 A1 | 6/2016 | Chung | |
| 2019/0136583 A1* | 5/2019 | Gray | E05B 83/40 |
| 2020/0408004 A1* | 12/2020 | Contreras | E05B 77/36 |
| 2021/0238895 A1* | 8/2021 | Kovie | B60J 5/0433 |

* cited by examiner

VEHICLE DOOR ASSEMBLY INCLUDING A DOOR LATCH STOPPER BRACKET

TECHNICAL FIELD

The present specification generally relates to vehicle door assemblies for vehicles and, more specifically, to vehicle door assemblies including latch release lever blocking structures.

BACKGROUND

Door latch assemblies for vehicles may be provided and are used to latch a vehicle door, such as a driver side door or a passenger side door in a closed position. The door latch assemblies may include a door latch device within the vehicle door that can engage a cooperating structure, such as a striker that is located on a frame of the vehicle. The vehicle door may remain in the closed position until a vehicle occupant actuates a door handle, which then opens the door latch device.

For some side impact tests, vehicle door structures may move inboard, which may affect operation of the door latch assemblies. What is desired are blocking structures that can block unintended actuation of the door latch assemblies under certain side impact conditions.

SUMMARY

In one embodiment, a vehicle includes a vehicle door assembly that includes a door handle assembly and a door latch assembly that includes a door latch device operatively connected to the door handle assembly using a latch release lever that moves along a travel path to place the door latch assembly in an unlatched configuration. The door latch assembly includes the latch release lever that is configured to move between a latched configuration and the unlatched configuration. A glass guide assembly is mounted in the vehicle door assembly including a guide body and a door latch stopper bracket mounted to the guide body arranged and configured such that movement of an outer door panel toward an inner door panel during a side impact event moves the guide body toward the door latch assembly and causes the door latch stopper bracket to engage the latch release lever and inhibit movement of the latch release lever toward the unlatched configuration.

In another embodiment, a method of controlling unlatching of a vehicle door latch assembly is provided. The method includes mounting a door latch stopper bracket to a guide body of a glass guide assembly. The glass guide assembly is arranged and configured such that movement of an outer door panel toward an inner door panel during a side impact event moves the guide body toward the door latch assembly and causes the door latch stopper bracket to engage the latch release lever and inhibit movement of the latch release lever toward the unlatched configuration. The glass guide assembly including the guide body and the door latch stopper bracket is mounted within a vehicle door assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles that include a vehicle door assembly including a door handle assembly and a door latch assembly that includes a door latch device operatively connected to the door handle assembly using a latch release lever that moves along a travel path to place the door latch assembly in an unlatched configuration. The door latch assembly includes the latch release lever that is configured to move between a latched configuration and the unlatched configuration. A glass guide assembly is mounted in the vehicle door assembly and includes a guide body and a door latch stopper bracket that is mounted to the guide body such that movement of an outer door panel toward an inner door panel during a side impact event causes the door latch stopper bracket to engage the latch release lever and inhibit movement of the latch release lever toward the unlatched configuration.

During certain side impact conditions, vehicle door structures within the vehicle door assemblies can move inboard and other directions. Movement of the vehicle door structures can include the latch release lever. To inhibit unintended movement of the latch release lever, the door latch stopper bracket is provided. The door latch stopper bracket is provided to move into a travel path of the latch release lever under side impact conditions where the door latch stopper bracket is moved due to an external force applied to the vehicle door assembly. The door latch stopper bracket is moved into the travel path of the latch release lever to close a travel path of the latch release lever that is present under normal operating conditions and prevent unintended movement of the latch release lever that may affect operation of the door latch device.

Figure 1:
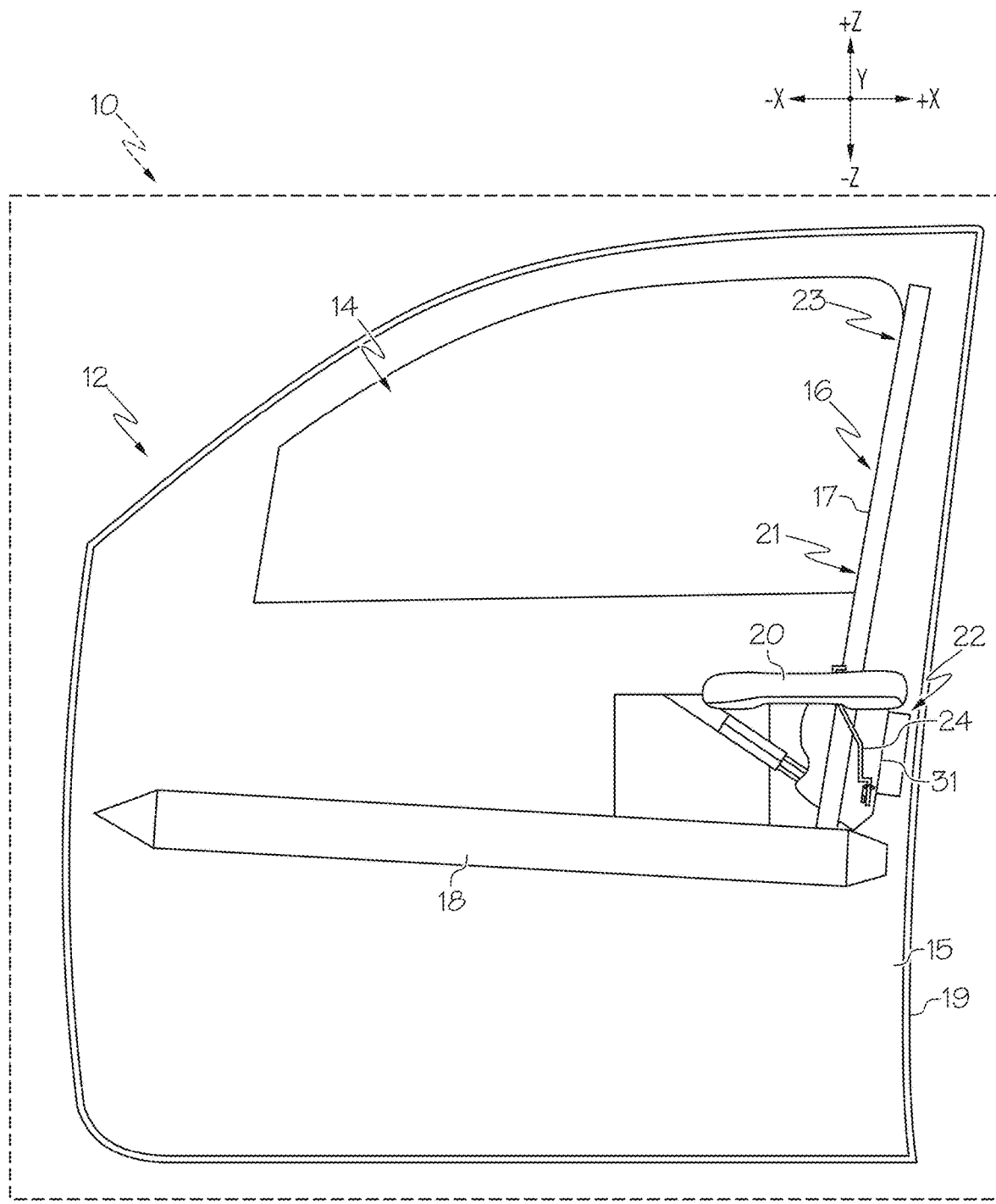
FIG. 1 is a diagrammatic interior view of a vehicle door assembly of a vehicle including a door latch assembly without latch release lever, according to one or more embodiments shown and described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction of the vehicle (i.e., in the +/−vehicle Y-direction depicted in FIG. 1), and is transverse to the vehicle longitudinal direction. Further, the terms "inboard" and "outboard" are used to describe the relative positioning of various components relative to a centerline of the vehicle. Because the vehicle structure of the vehicle may be generally symmetrical about the vehicle centerline, the use of terms "inboard" and "outboard" may be switched when evaluating components positioned along opposite sides of the vehicle.

Referring to FIG. 1, a vehicle, represented by element 10, includes a vehicle door assembly 12, a window 14 and a door latch assembly 22. The window 14 can move up and down between an open configuration and a closed configuration using a glass guide assembly 16 including a guide body 17 that provides a track 21 (FIG. 5) that guides an edge 23 of the window 14. A door reinforcement beam 18 is provided, such as a dent reinforcement, that reinforces the vehicle door assembly 12 during various impacts.

The door latch assembly 22 includes a door latch device 31 that is positioned at a shut face panel 19 of the vehicle door assembly 12. The door latch device 31 is operatively connected to an exterior door handle 20. The exterior door handle 20 is accessible from outside the vehicle 10. The door handle 20 is operatively connected to the door latch device 31 through one or more linkages, including a latch release lever 24. The latch release lever 24 is used to move the door latch device 31 from a latched configuration to an unlatched configuration. In the latched configuration, the door latch device 31 is engaged with a cooperating structure, such as a striker to inhibit unintended opening of the vehicle door assembly 12. In the unlatched configuration, the door latch device 31 disengages the cooperating structure, which allows the vehicle door assembly 12 to be opened. In the illustrated example, the vehicle door assembly 12 may be a front driver's door; however, the door latch assembly 22 may be equally applicable to any of the vehicle doors, including a rear door (e.g., of an SUV, van, etc.). It should be noted that the position of the door reinforcement beam 18 may vary depending on the make and model of a specific vehicle.

The vehicle door 12 may include an outer panel 50 (FIG. 6) and one or more inner panels 15 that are connected to the outer panel 50 to define a volume therebetween. The outer panel 50 may be an outer visible panel of the vehicle body 10, while the inner panel 15 may be an interior door trim panel that is visible from inside the vehicle 10. The door latch assembly 22 may be located at least partially within the volume between the outer panel 50 and the inner panel 15 of the vehicle door 12. The door latch assembly 22 may be operatively coupled to the vehicle door handle 20 that can be used to move the door latch assembly 22 between the unlatched and latched configurations for opening and closing the vehicle door 12 against the vehicle body. The door latch assembly 22 may be moved from the latched to the unlatched configuration by manually tugging on the vehicle door handle 20 that may be biased inward toward the latched configuration.

Figure 2:
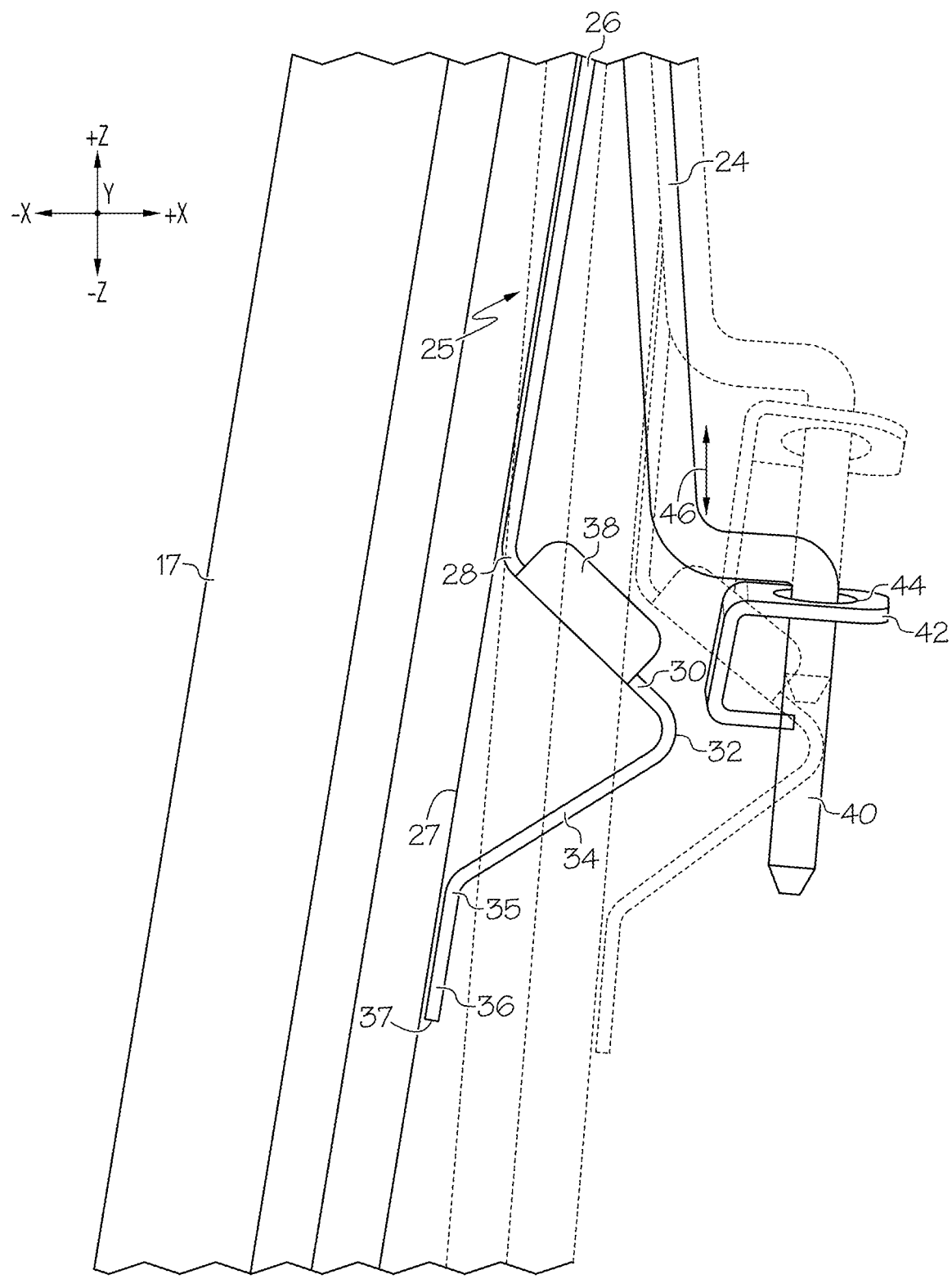
FIG. 2 is a diagrammatic front view of a glass guide assembly that includes a guide body and a door latch stopper bracket and a latch release lever, according to one or more embodiments shown and described herein.
Figure 3:
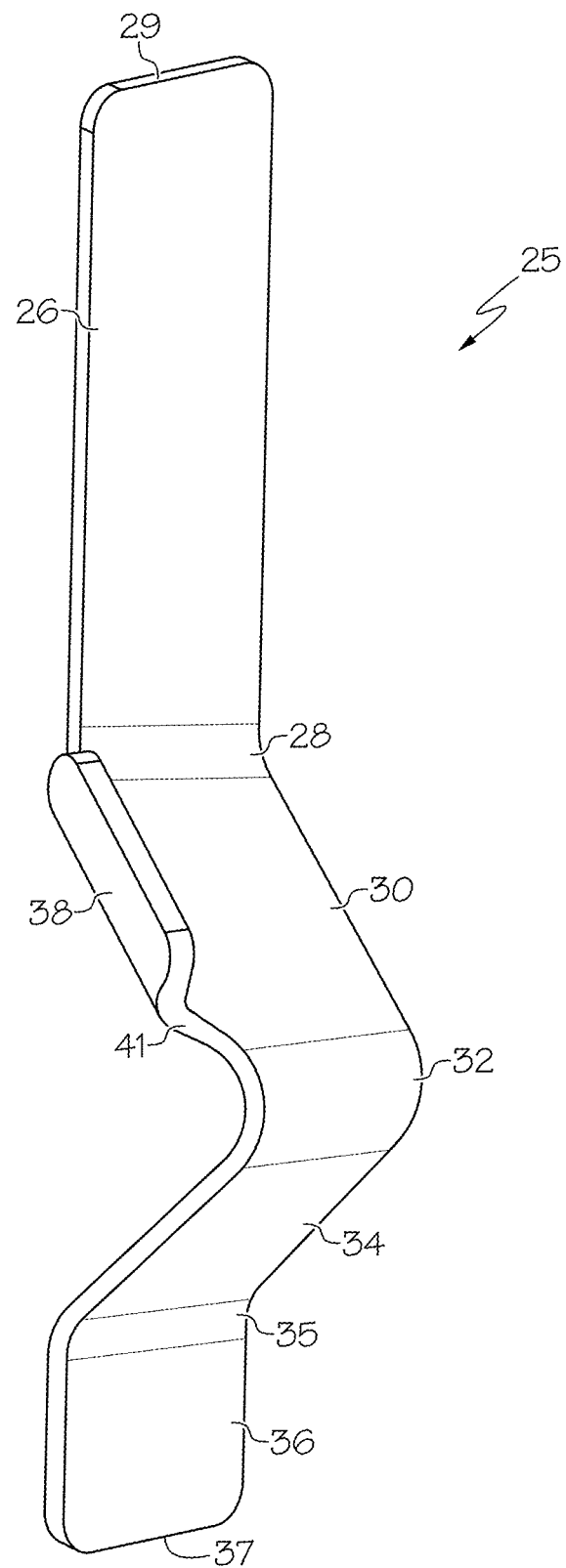
FIG. 3 is a diagrammatic perspective view of the door latch stopper bracket of FIG. 2, according to one or more embodiments shown and described herein.

Referring to FIG. 2, a portion of the guide body 17 is shown in more detail. A door latch stopper bracket 25 is shown mounted to a side 27 of the guide body 17. The door latch stopper bracket 25 may be mounted using any suitable method, such as fasteners, welding, etc. Referring also to FIG. 3, the door latch stopper bracket 25 includes a first leg 26 that extends vertically from a first terminal edge 29 to a bend 28. A stopper portion 30 extends longitudinally away from the guide body 17 and rearward from the bend 28 to an apex 32. The stopper portion 30 may be slanted downward toward the apex 32, which is a turn toward a return portion 34 that extends longitudinally toward the guide body 17 and forward from the apex 32 to another bend 35 forming a V-shape. A second leg 36 extends vertically from the bend 35 to a second terminal edge 37. A lever catch flange 38 may be provided that extends outward vertically from the stopper portion 30 at a side 41.

Figure 4:
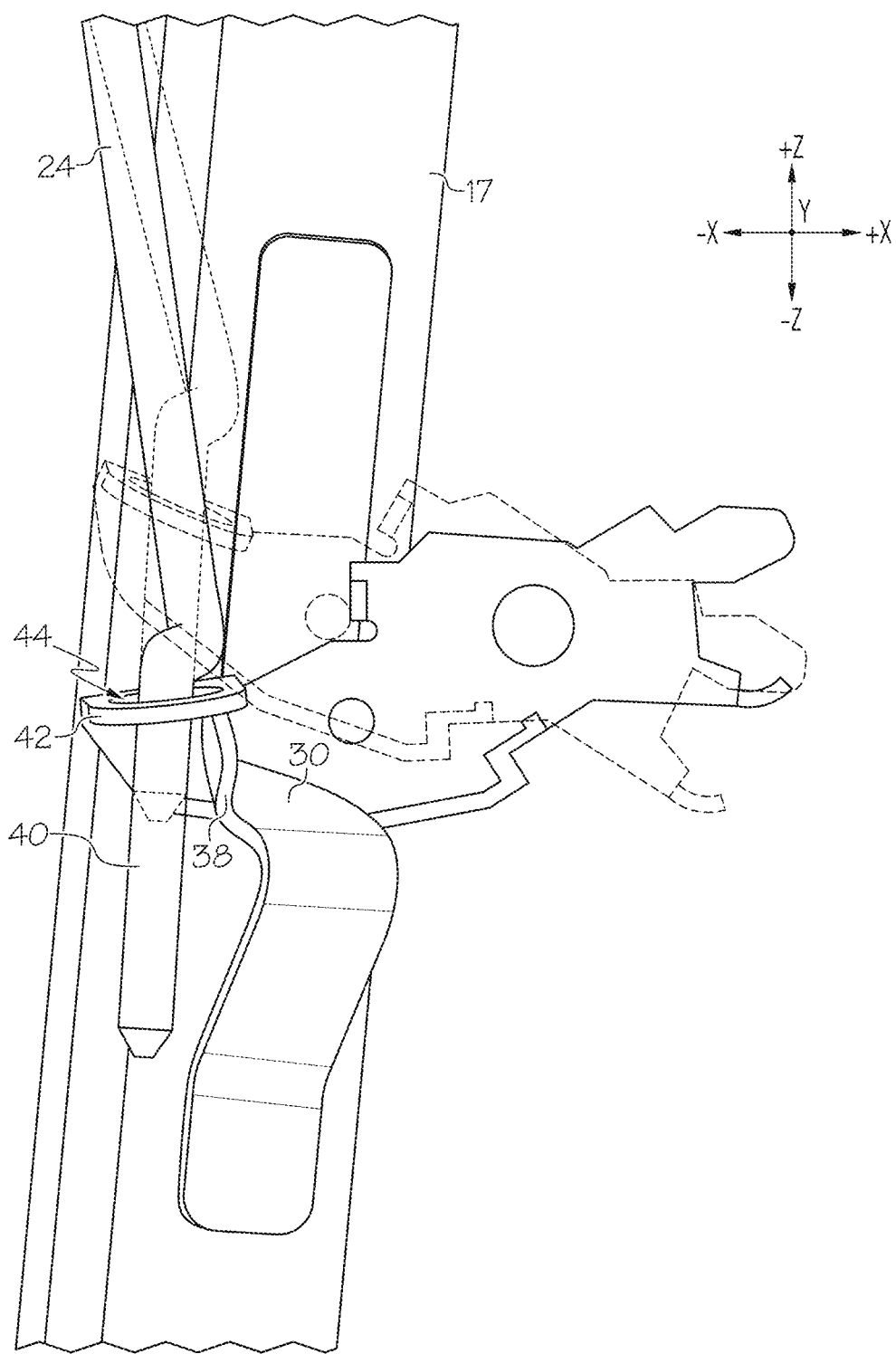
FIG. 4 is a diagrammatic side view of the glass guide assembly and latch release lever of FIG. 2, according to one or more embodiments shown and described herein.

Referring again to FIG. 2 and also to FIG. 4, the door latch assembly 22 includes the latch release lever 24 that is operatively connected to a door latch lever 42. In particular, the latch release lever 24 has an end portion 40 that is threaded through an opening 44 in the door latch lever 42. The latch release lever 24 is used to force the door latch lever 42 from a latched configuration, shown by dashed lines, to an unlatched configuration, shown in solid lines.

When a vehicle experiences an impact, vehicle structures may elastically and plastically deform. The impact diverts the energy associated with a moving vehicle into energy that deforms vehicle structures. The vehicle structures may be designed to accommodate such impact events, such that the energy associated with the impact may be controllably dissipated through selective and preferential deformation of the vehicle structures.

Figure 6:
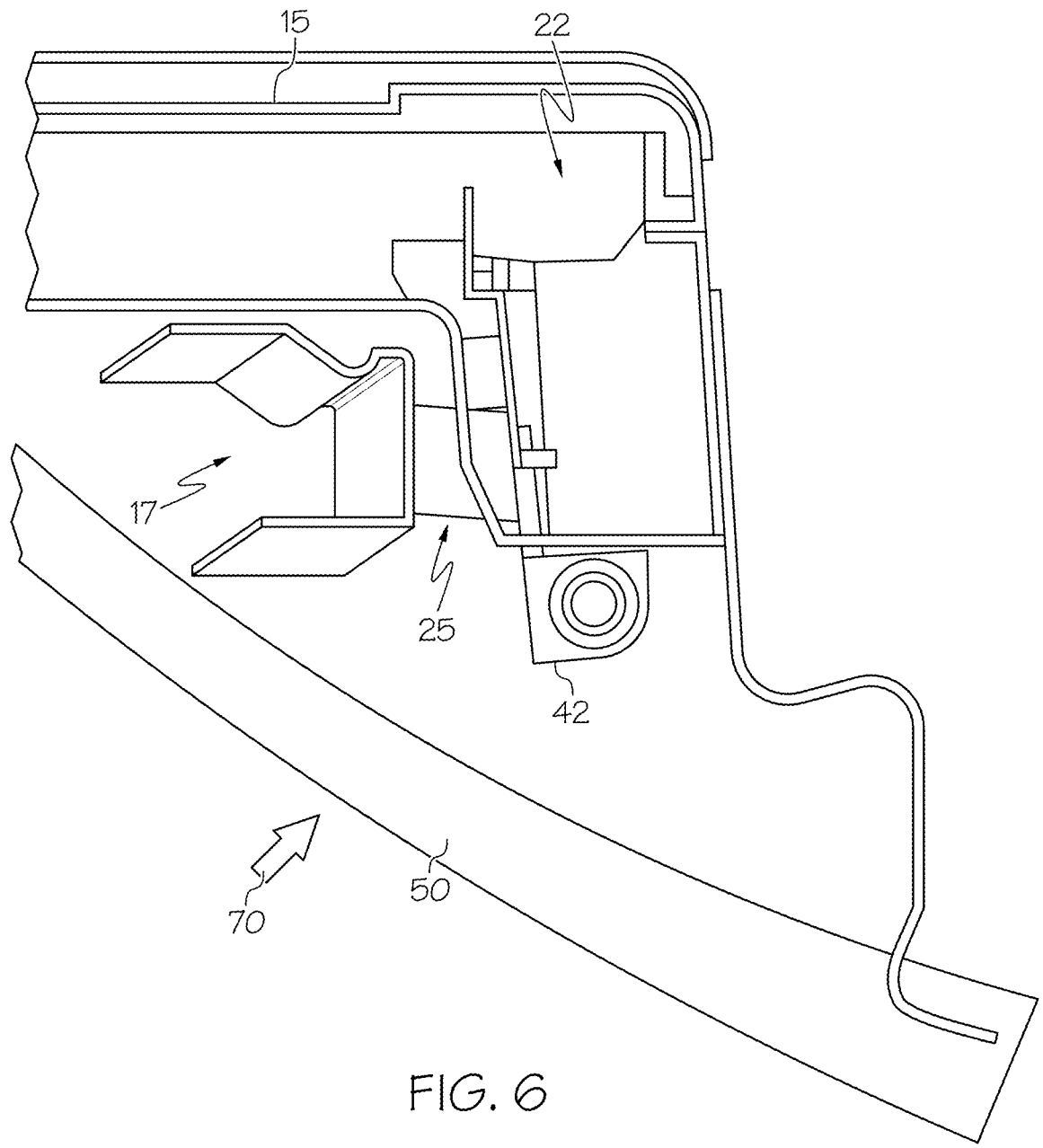
FIG. 6 is a diagrammatic top view of the glass guide assembly and stopper portion of the latch release lever of FIG. 5 in a blocking configuration, according to one or more embodiments shown and described herein.

When a vehicle experiences a side impact, energy may be received in the areas of the vehicle door assembly 12, as represented by arrow 70 in FIG. 6. As the door structures move inward in the vehicle lateral direction, they may impinge upon the exterior door handle 20, the guide body 17 and the door latch assembly 22. In order to inhibit unintended movement of the door latch lever 42 toward the unlatched configuration during such movement of the vehicle door structures, the door latch stopper bracket 25 is provided.

Figure 5:
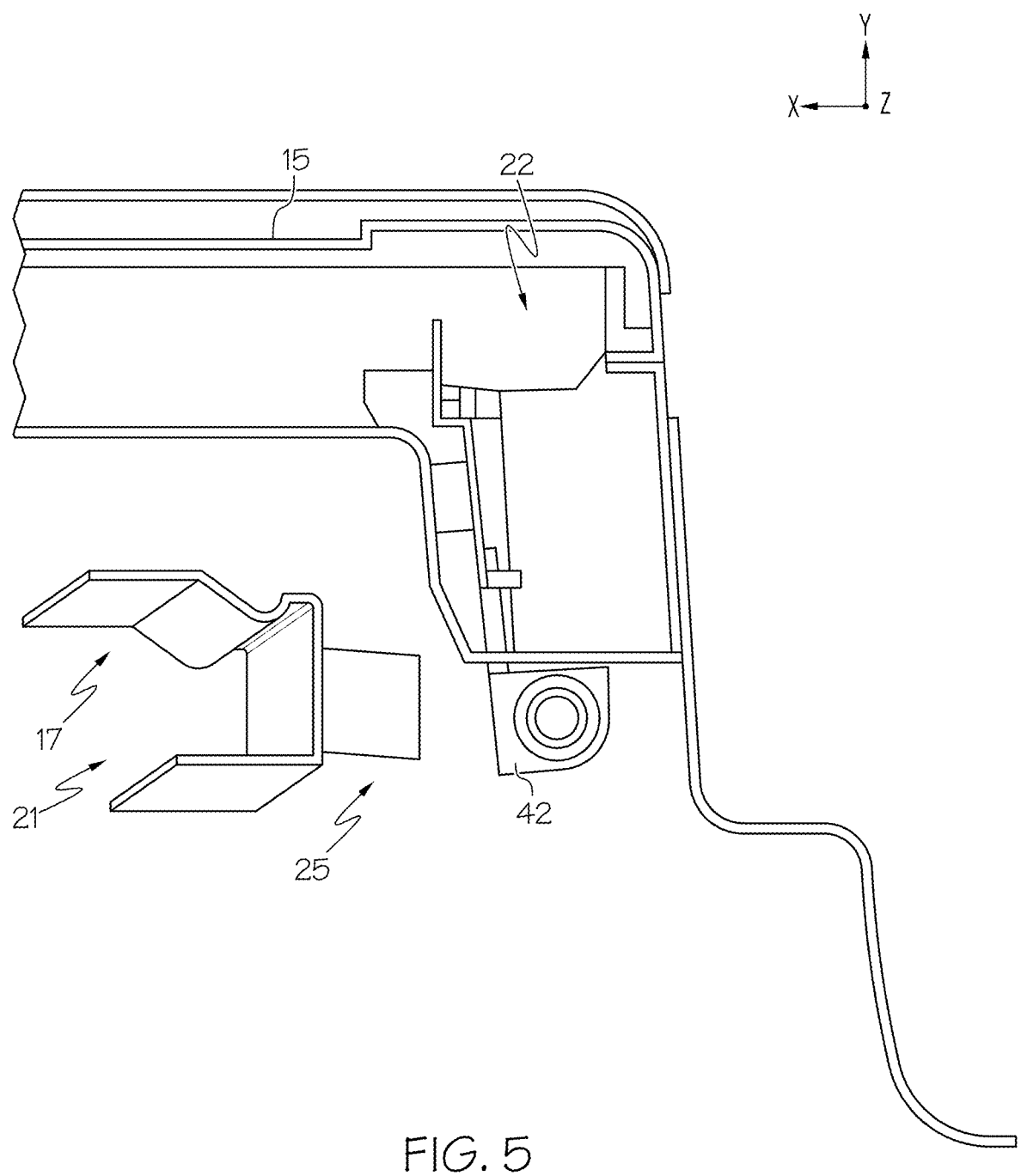
FIG. 5 is a diagrammatic top view of the glass guide assembly within a vehicle door assembly in an initial configuration and stopper portion of the latch release lever of FIG. 2, according to one or more embodiments shown and described herein.

FIG. 2 illustrates the door latch stopper bracket 25 mounted to the guide body 17 in both an initial configuration, shown in solid lines, and a blocking configuration, shown in dashed lines. FIG. 4 illustrates the door latch stopper bracket 25 in the blocking configuration. In the blocking configuration, the door latch stopper bracket 25 moves beneath the door latch lever 42 and the end portion 40 of the latch release lever 24 such that they can engage the stopper portion 30 of the door latch stopper bracket 25. FIG. 5 shows the door latch stopper bracket 25 and guide body 17 in the initial configuration. Referring to FIG. 6, as the outer panel 50 moves inboard due to a side impact, the vehicle door structures, including the outer panel 50 and the door reinforcement beam 18 can also move inboard and rearward, which can force the guide body 17 rearward within the vehicle door assembly 12. This repositioning of the guide body 17 can move the door latch stopper bracket 25 into the desired blocking configuration shown by FIGS. 2, 4 and 6. Further, movement of the outer panel 50 inboard can push the guide body 17, along with other structures, such as the door reinforcement beam 18 into the guide body 17.

The above-described vehicle door assemblies include a door latch assembly and a door latch stopper bracket that is mounted to a guide body of a glass guide assembly. The glass guide assembly, along with the door latch stopper bracket, can move toward the door latch assembly during a side impact in a predictable manner to move the door latch stopper bracket into the travel path of a door latch lever. This movement of the door latch stopper bracket into the travel path of the door latch lever can inhibit downward movement of the door latch lever into an unlatched configuration, thereby maintaining the door latch assembly in a latched configuration.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a vehicle door assembly comprising:
        a door handle assembly; and
        a door latch assembly that includes a door latch device operatively connected to the door handle assembly using a latch release lever that moves along a travel path to move the door latch assembly between a latched configuration and an unlatched configuration, the door latch assembly comprising the latch release lever that is configured to move between a first configuration where the door latch assembly is in the latched configuration and a second configuration where the door latch assembly is in the unlatched configuration; and
        a glass guide assembly mounted in the vehicle door assembly and including a guide body and a door latch stopper bracket mounted on the guide body, the guide body arranged and configured such that movement of an outer door panel of the vehicle door assembly toward an inner door panel of the vehicle door assembly during a side impact event moves the guide body toward the door latch assembly and causes the door latch stopper bracket to move to a blocking configuration and engage the latch release lever to inhibit movement of the latch release lever toward the second configuration;
    wherein the door latch stopper bracket comprises a first leg mounted on the guide body that extends vertically from a first terminal edge of the bracket located above the latch release lever down alongside the guide body to a first bend and a stopper portion that extends from the first bend longitudinally away from the guide body toward an apex of the door latch stopper bracket, the stopper portion configured to contact the latch release lever when the door latch stopper bracket is in the blocking configuration.

2. The vehicle of claim 1, wherein the door latch stopper bracket comprises a return portion that extends from the apex toward the guide body to a second bend and a second leg mounted to the guide body that extends vertically from the second bend to a second terminal edge of the bracket.

3. The vehicle of claim 1, wherein the door latch stopper bracket comprises a lever catch flange that extends vertically from the stopper portion.

4. The vehicle of claim 1, wherein the door latch stopper bracket comprises a return portion that extends from the apex toward the guide body forming a V-shape with the stopper portion.

5. A method of controlling an unlatching of a vehicle door latch assembly, the method comprising:
    mounting a door latch stopper bracket to a guide body of a glass guide assembly of a vehicle door assembly, the glass guide assembly arranged and configured such that movement of an outer door panel of the door assembly toward an inner door panel of the door assembly during a side impact event moves the guide body toward the door latch assembly and causes the door latch stopper bracket to move to a blocking configuration and engage a latch release lever to inhibit movement of the latch release lever toward a position which causes the door latch assembly to move to an unlatched configuration; and
    mounting the glass guide assembly including the guide body and the door latch stopper bracket within the vehicle door assembly;
    wherein the door latch stopper bracket comprises a first leg mounted on the guide body that extends vertically from a first terminal edge of the bracket located above the latch release lever down alongside the guide body to a first bend and a stopper portion that extends from the first bend longitudinally away from the guide body toward an apex of the door latch stopper bracket, the stopper portion contacting the latch release lever when the door latch stopper bracket is in the blocking configuration.

6. The method of claim 5 further comprising the guide body guiding a window as the window travels between an open configuration and a closed configuration.

7. The method of claim 5, wherein the door latch stopper bracket comprises a return portion that extends from the apex toward the guide body to a second bend and a second leg mounted to the guide body that extends vertically from the second bend to a second terminal edge of the bracket.

8. The method of claim 5, wherein the door latch stopper bracket comprises a lever catch flange that extends vertically from the stopper portion.

9. The method of claim 5, wherein the door latch stopper bracket comprises a return portion that extends from the apex toward the guide body forming a V-shape with the stopper portion.

* * * * *